May 23, 1961 H. S. SMITH 2,985,376
MONORAIL CONSTRUCTIONS
Filed March 20, 1957 6 Sheets—Sheet 6

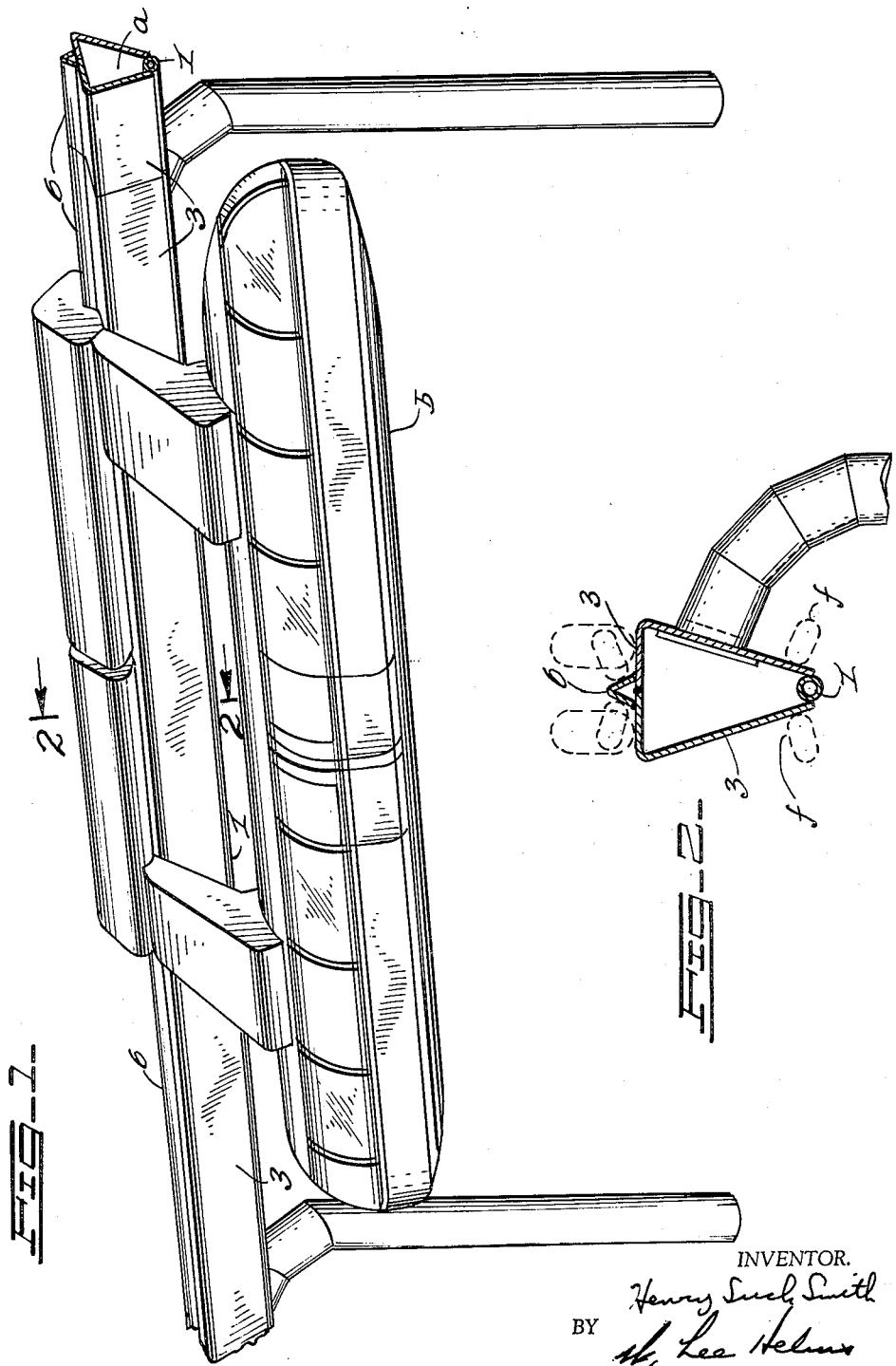

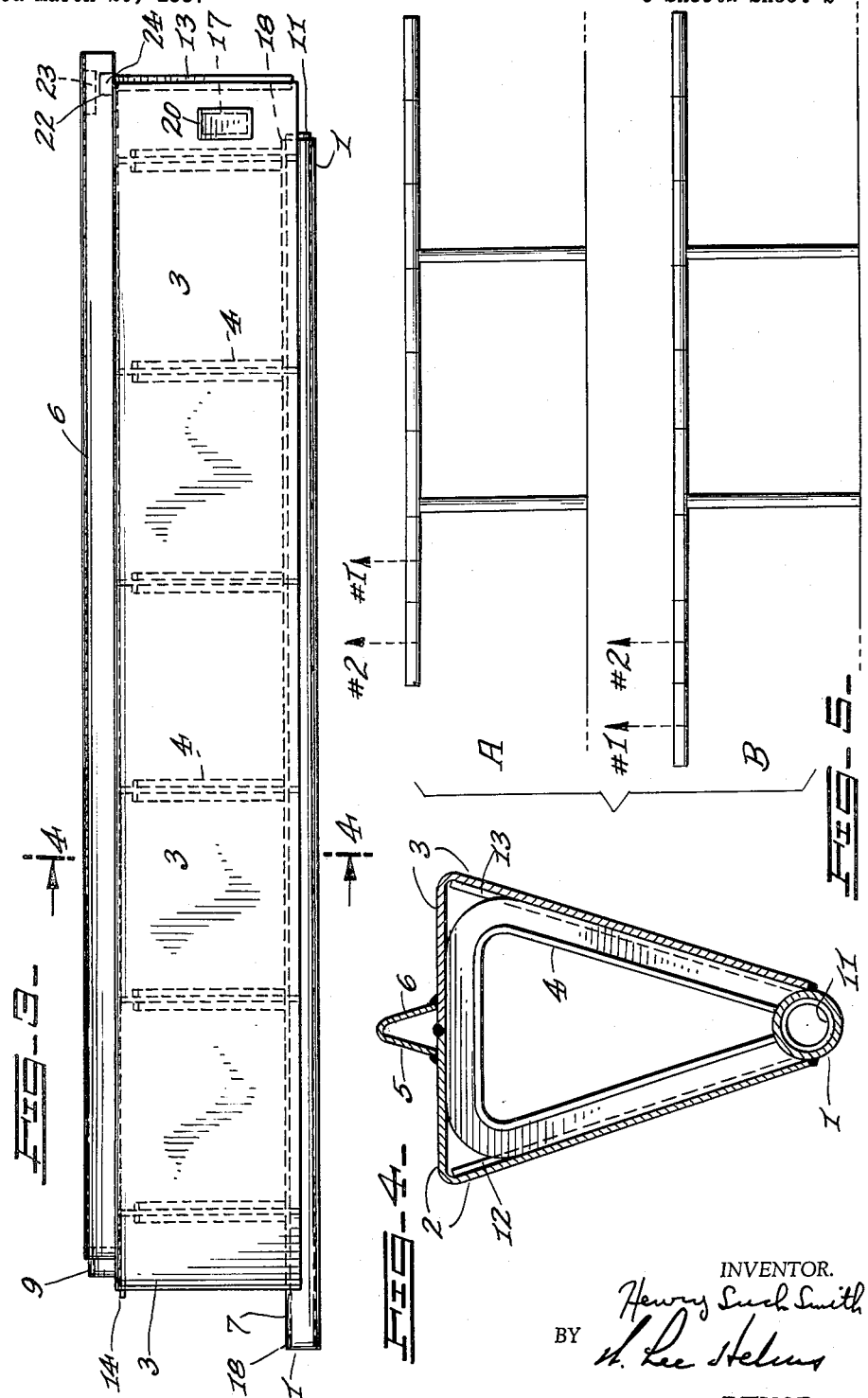

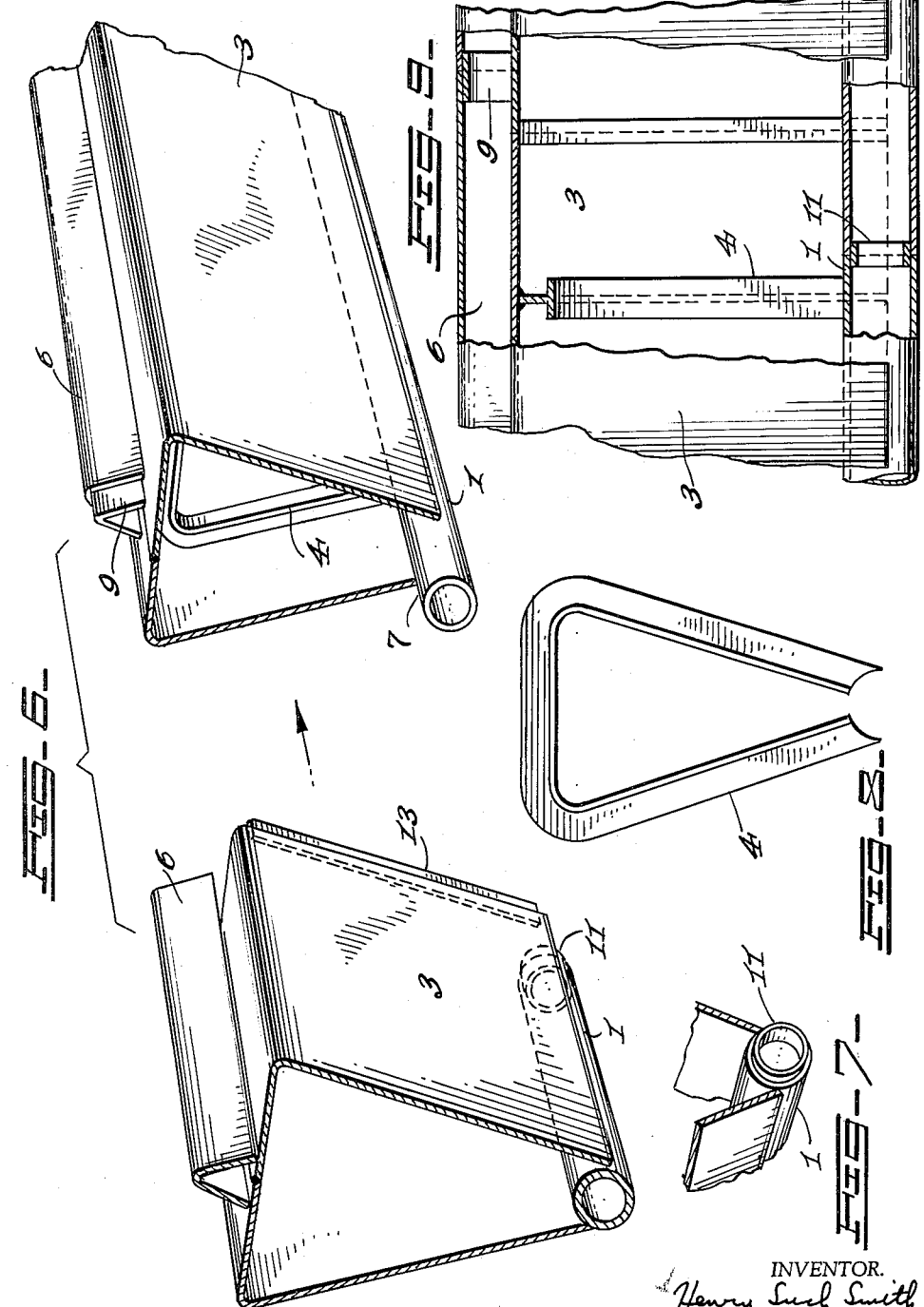

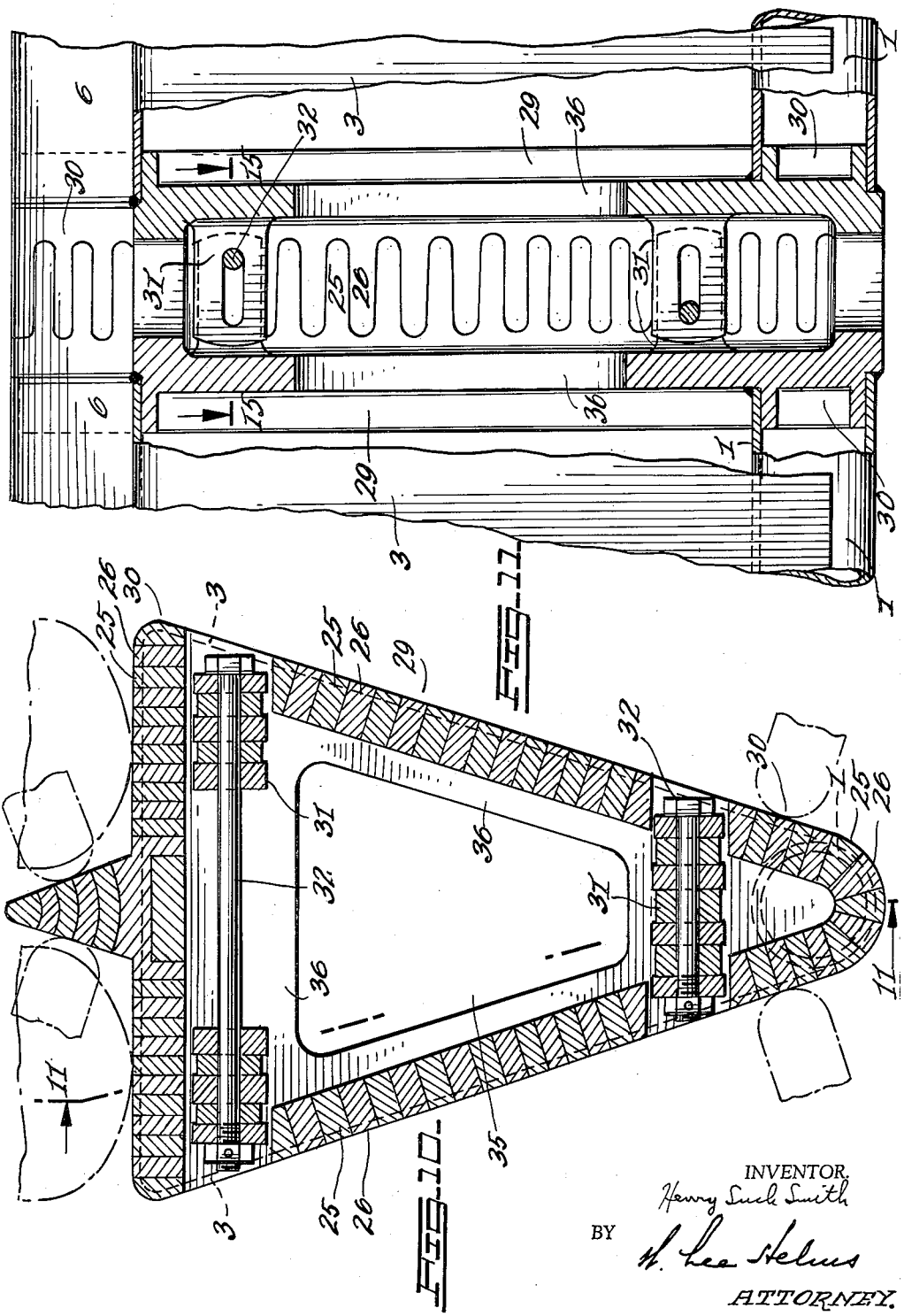

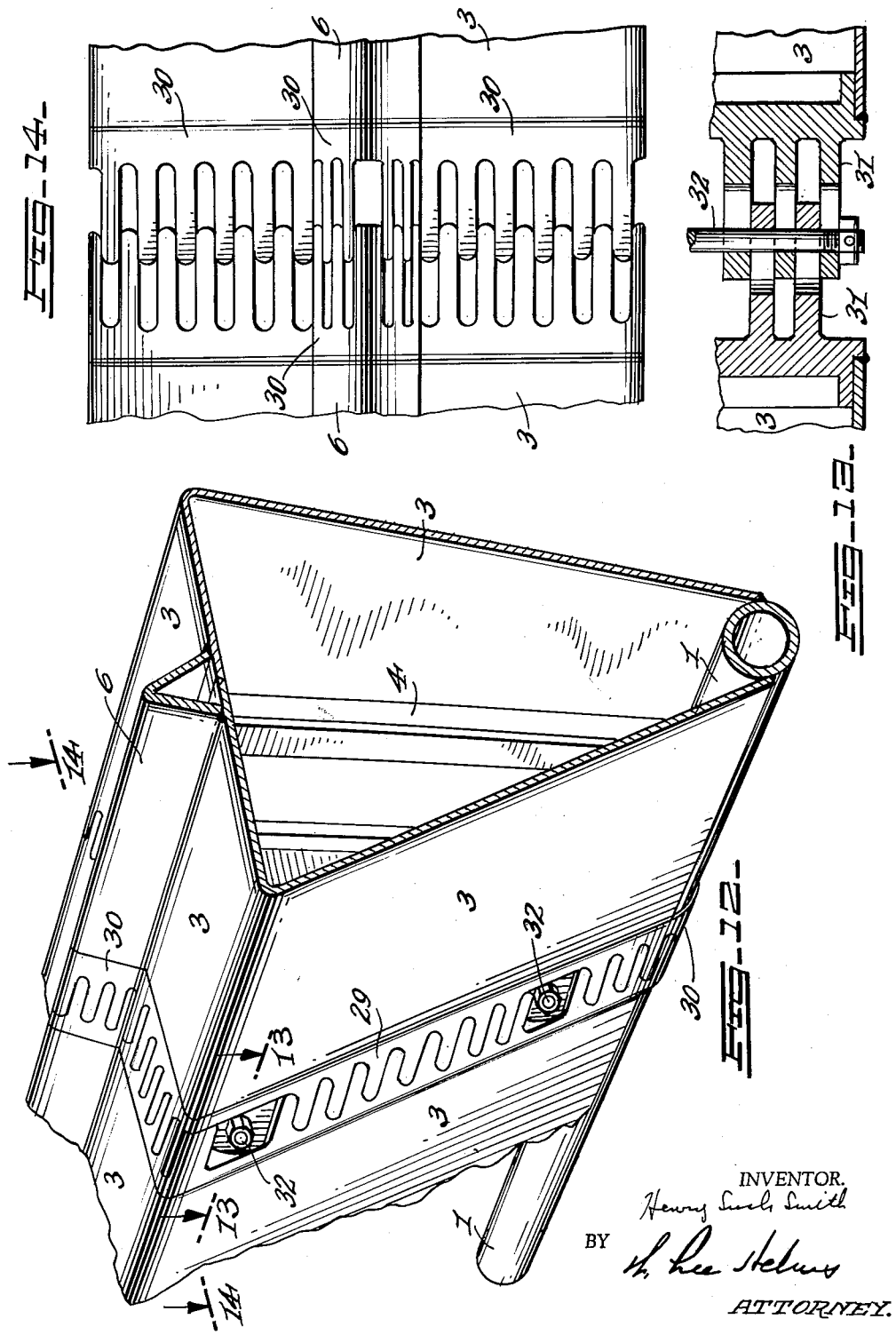

INVENTOR
HENRY SUCH SMITH
BY *H. Lee Helms*
ATTORNEY

United States Patent Office 2,985,376
Patented May 23, 1961

2,985,376

MONORAIL CONSTRUCTIONS

Henry Such Smith, Raritan Road, P.O. Box 55, Roselle, N.J.

Filed Mar. 20, 1957, Ser. No. 647,370

8 Claims. (Cl. 238—122)

Monorail transportation systems require the furnishing and installation of a continuously suspended railbeam made up of sections. This beam must be straight, free of surface irregularities and little subject to deflection and movement under severe dynamic load. It must be faultlessly safe, easy to inspect and maintain, and be permanently reliable.

As steel fabrication operations can be carried out under better supervision, with more reliability, and at lower cost under shop assembly conditions than in the field, it is desirable that the railbeam sections be shop prefabricated to the greatest possible extent. To meet these requirements as to accuracy of alignment and reliability of construction, prefabricated railbeams of the largest practical size and greatest practical length must be integrated in the field with the least amount of well-positioned welding at the jobsite.

For convenience in field erection, the prefabricated section should have joints designed to facilitate joining, alignment, and symmetrical welding, and to permit a reasonable sequence of symmetrical welding operations to properly control the stress unavoidably placed in the metal by the welding operations. Such an arrangement for joining the sections saves labor, requires less supervision, and gives a more reliable finished job.

Expansion joints must be provided at reasonable intervals. These joints must hold the adjacent railbeam sections in perfect alignment against forces of tension, compression, shear, torsion, and possible dynamic flutter of the monorail car at certain speeds. They must extend and retract without interrupting the continuity of the running surfaces on the rail to avoid bumping the numerous carrying and guiding tires of the monorail car as they pass the joint. The fact that these tires may, to some extent, be pre-loaded against the railbeam to prevent car flutter and sway further dictates that, while carrying great weight, the expansion joint surface must neither permit the wheels to drop below the adjacent railbeam surfaces, nor force the wheels up off these surfaces.

The present invention provides improvements in structure of certain of the pre-formed elements, their relative placement in the railbeam section, and a welding sequence to permit substantial prefabrication and produce a straighter, stronger, and more reliable monorail transportation system at lower installed cost, and which takes care of expansion and construction forces with full maintenance of strength.

In the accompanying drawings:

Fig. 1 is a schematic view in perspective showing a section of the monorail assembly with a car supported thereby.

Fig. 2 is a vertical section on the line 2—2, Fig. 1.

Fig. 3 is a view in elevation, partly in dotted lines showing an assembly of monorail elements constituting one overhead section to be supported by pylons.

Fig. 4 is a vertical section on the line 4—4, Fig. 3.

Fig. 5 is a schematic welding-procedure view in elevation composed of an upper representation, and a lower representation having one additional monorail section welded thereto.

Fig. 6 is a composite view in perspective and vertical section showing two monorail sections ready for interfitting and welding.

Fig. 7 is a fragmentary view showing the bottom portion of the left hand section of Fig. 6.

Fig. 8 is a view in elevation of the stiffener.

Fig. 9 is a fragmentary section of the monorail, in elevation, and at the welded jointure of two monorail sections.

Fig. 10 is a vertical section of a special jointure between two monorail sections, providing for expansion and contraction.

Fig. 11 is a longitudinal cross sectional view taken along line 11—11 of Figure 10, partly broken away showing the structure of Fig. 10.

Fig. 12 is a fragmentary isometric view showing the structure of Figs. 10 and 11.

Fig. 13 is a fragmentary horizontal section taken generally on the lines 13—13, Fig. 12.

Fig. 14 is a fragmentary top plan view taken along line 14—14 of the structure shown in Fig. 12.

Figure 15:
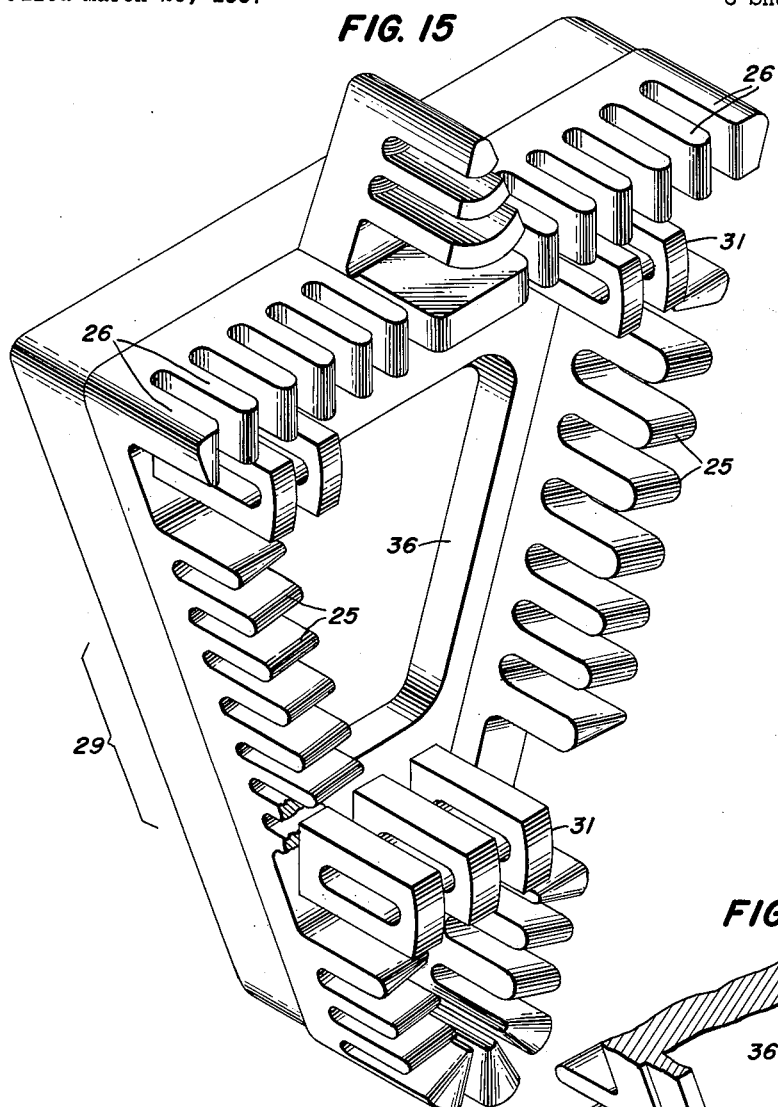
Fig. 15 is a perspective view of a casting forming one member of the expansion joint.
Figure 16:
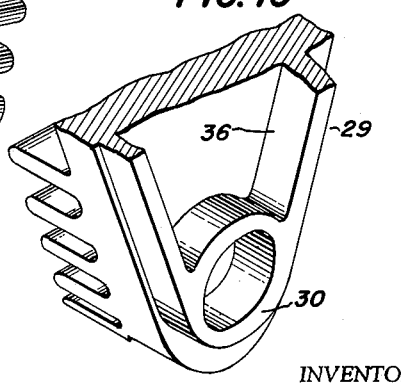
Fig. 16 is a fragmentary view showing the opposite face of Fig. 15 at the lower end thereof.

As shown in Figs. 3 and 4, the monorail section is primarily composed essentially of a bottom chord for tension, i.e., the pipe 1, a top chord consisting of the two horizontal top inwardly turned portions of the side plates 3, and a pair of inwardly located joining webs or welding back-up strips 13. At appropriate intervals within the section, stiffeners 4 are provided. These are conveniently, but not necessarily, made of T sections.

On top of the structure is welded the inverted V car-guide and top chord stiffening member 6. At one end of the structure the bottom chord pipe 1 projects a considerable distance as shown at 7, Fig. 3. At the opposite end, the inverted V guide section projects a smaller distance as shown by the left-hand representation of Fig. 6. At the reverse end of the inverted V guide section, at the end of the prefabricated section where the pipe projects, a smaller inverted V shaped guide tongue 9 projects a short distance.

At appropriate places, thin back-up strips or tubes to permit welding as much as possible from the outside, are supplied. A back-up tube 11 is thus placed in the recessed end of the pipe, as shown in Figs. 6 and 7, and a pair of welding back-up strips 13 is placed within the outer margins of the steeply inclined member 3 at the end where the pipe 1 is recessed. The short section of inverted V shaped guide tongue 9 which fits within the main guide inverted V section 6 provides back-up material for the welded joint to be formed at such area.

Handholes 17 at a reasonable distance from the vertical ends of the main railbeam inclined sides are provided, and as close to their horizontal neutral axis as practical, to permit welding at the top 18 of the pipe 1 during field erection. Simple cover plates 20 may be welded on after the pipe joint at 18, Fig. 3, has been welded. Opposed cut-outs, one being shown at 22, Fig. 3, are provided in member 6 to permit welding of the joined areas underlying the same. If required, an internal stiffener 23 may be provided and secured by welding or other means within the member 6 to strengthen its end enough to facilitate the proper assembly. Since guide wheels of the monorail car run against the inclined sides of member 6, a special insert 24 is provided to snap into place for each cut-out hole 22 and welded in place followed by smooth grinding, to provide a smooth surface.

Referring to Fig. 5, representation A, erection of the railbeam proceeding from right to left is indicated with three monorail sections per pylon. The upward arrow #1 represents one of two cranes holding the first railbeam section projecting beyond the last supporting pylon. The upward arrow #2 represents a second crane bringing the next railbeam down and to the right. The end result of this operation is perfect register of the added railbeam section as shown in Fig. 9. When the just-added railbeam section has been properly welded, the first crane, represented by upward arrow #1, is released for duty beyond crane #2. Fig. 5, representation B, shows installation by crane #1 of the following railbeam section in a similar manner.

Referring to Fig. 10 and Fig. 15, two castings 29 with interfitting sets of tongues 25, 26, each casting welded to and protruding from the face of its respective member 3 constitute a joint which permits expansion and contraction of the joined members 3. The group of heavy tongues 25, 26 at the middle and upper portion of the inclined sides of member 3 and at the circular bottom of the monorail section constitute the shear bearing, and torsion resisting elements of the expansion joint. The group of lighter tongues at the top of the monorail section and at the lower portion of its inclined sides constitute the running surface for the tires of the monorail car.

The expansion joint is prevented from lineal separation by provision of matching interlocking tongues 31 formed with elongated slots, Fig. 11 and Fig. 15, through which appropriate heavy pins 32 are placed and screwed by standard means.

Each of the major longitudinal elements of the monorail beam section may be approximately 20 feet long. The pipe 1 preferably is of 6″ diameter and of appropriate thickness. The main top and inclined side plates will be of steel approximately ⅜″ thick. Of these combined-purpose plates, the horizontal section of each plate forming member 3 may be approximately 15½″ wide. Each appended, inclined vertical portion is approximately 38″ from the flange to its lower edge where it is welded to the side of the pipe 1. The upper V guide 6 is formed of a single strip of ¼″ plate approximately one foot wide so that its height is approximately 6″. The inverted V guide is made so that each side leans at approximately 15 degrees from the vertical.

In shop fabrication, each side of member 3 will be formed with an angle of approximately 75 degrees. Thus when the top surfaces of these main structural plates are horizontal, the lower inclined areas would extend in from the vertical approximately 15 degrees.

To assemble, after the two main side plates of member 3 have been arranged to face each other with the top surfaces horizontal and matching, they are tack welded. After being tacked, a continuous weld by manual or automatic means is carried down the central joint. The partial structure is then turned upside down with the inclined portions of the side plates now extending inwards to a gap of approximately 6″ in which pipe 1 is to be installed. The pipe is installed with one end 7 (Fig. 6) projecting approximately a foot and sunk to approximately half its diameter between the inclined side plates. Here the pipe is held by suitable jigs in exact alignment and after appropriate tack welding, final production welding proceeds by manual or automatic means, preferably with the two sides being welded simultaneously.

The partially completed monorail section is turned over to the position in which it will be used, that is with the flat side upward and the pipe downward. It is now ready for application of the inverted V guide member 6.

This guide member is separately readied by the installation of the smaller extension 9 which is approximately 6″ long and welded with its end protruding 3″. By use of holes and plug welding or other methods, this small matching V is fastened so that no welding metal is present to interfere with matching of sections when they are to be joined in the field.

The long inverted V guide member is now placed in the center of the main monorail beam section with 6″ of one end protruding beyond the main beam section at the end opposite that where the pipe protrudes in the other direction. After symmetrical tack welding, the inverted V section is finish welded to the top of the main monorail beam by symmetrical manual or automatic welding torches operating and moving simultaneously. It is to be noted that the end of the smaller inverted V tongue 9 sets back from the end of the member, say 3″, and the full length inverted V section only commences 3″ further, or 6″ from the end of the main beam section 10 at the end from which the pipe projects.

The stiffeners 4, which may be of T or other section as required, are welded with a staggering series of intermittent tack welds to prevent chance of distortion of member 3.

An alternative embodied in the spirit of the invention is that by the use of heavy machinery, the entire sides and top of member 3 could be formed from one piece, thus eliminating the continuous weld at the middle of its top surface. This operation, could conveniently be performed by the following operation: In practice, a plate of approximately ⅜″ thickness, approximately 107″ wide, and the length of the railbeam section would be longitudinally bent up along its middle. That is, what subsequently would be the flat top surface of the finished railbeam section is temporarily bent in the form of an upturned V trough. At appropriate lines on each side of the center, the outward wings of the large plate would be bent down, each wing to include an angle of 75 degrees as explained in the earlier method of construction. The preliminary bend which is temporary, would provide room for the machine to make the two side bends. Now the whole element would be inverted and placed back in the forming machine where the preliminary bend would be removed and the top of the element again made flat, bringing the two vertical inclined sides to their proper relationship to fit and grip the six inch pipe. While this procedure would bend the metal twice at the middle of its top surface, each bend would be of small amplitude, and the operation would be located at a neutral axis where the metal would not be stressed by normal or accidental strains of operation in the finished monorail system.

Reference has been made to specific back-up and reenforcing elements. Such elements additional to those referred to may be employed where needed. Thus at 14, Fig. 3, I have indicated at 14 a back-up strip placed under the longitudinal centre of the flat top of member 3 below tongue 9.

As corrosive conditions may be encountered at some locations, the expansion joint is sufficiently massive, and possesses sufficiently large bearing areas so that its usefulness will survive considerable corrosion. For some applications, it is desirable to hermetically seal the inner groups of railbeam sections between the expansion joints, therefore these joints must also provide means of effectively sealing the ends of the contiguous railbeam sections. For this purpose reference to Figs. 10 and 11 will show that each casting which forms one of the two expansion joint units 30 is formed with a lower tubular neck which is received within the appropriate pipe section 1, the latter being welded in place, access to the upper areas of the pipe being provided by the opening at 35 within continuous inwardly projecting flange 36. Before two monorail sections are brought together at an expansion joint area each facing end of the joint will be welded to its appropriate joint casting and the latter, in each case may be sealed at opening 35 by a plate welded upon flange 36, as will be understood without further explanation. This will prevent passage of moist air or corrosive gases to the interior of the joined monorail sections between the expansion joints. These joined sections between the expansion joints may run 300-400 feet in length, and for added protection anti-corrosive inert gas such as nitrogen may be contained in such sealed joined sections of the monorail. As a further utility, the joined sections may be employed as a fluid conduit inasmuch as the two opposed sealing plates (not shown) when carried on the flanges 36 of the castings 29 may intercommunicate by flexible conduits well known in the art of fluid transmission.

It will be understood that various modifications may be made in the form and arrangement of the elements shown in the embodiments illustrated without departure from the spirit of the invention.

A modification within the spirit of the invention is the placing of the pipe with its projecting end 7 at the same end of the main rail beam section as the inverted V top guide stiffener extension 8 rather than at the opposite end as shown in the drawing. Erection might be somewhat less convenient, but it might be felt that the prefabricated unit would thus be less subject to damage in transit. In the claims member 7 is termed "the tubular bottom tension chord," member 3, in joined combination of two elements, is termed "the angular hollow beam" and its horizontal joined flanges compose "the top chord of the angular hollow beam," and member 6 is termed "the top chord stiffener-guide." Inasmuch as members 9, 11 and 13 can be integral inward flanges of the members which carry them, by mechanically produced inward offset of metal depth, they are termed "inward flanges." In either case, the prefabricated monorail sections telescopically fit to each other in field erection, and enable major welded joints spaced from normally highly stressed welded cross-sectional lines joining opposed angular hollow beams.

What I claim and desire to secure by Letters Patent is as follows:

1. A monorail section composed of an angular hollow beam having a flat top and inwardly inclined sides and having, a tubular bottom tension chord, a longitudinal top chord stiffener guide secured to said flat top, and a casting welded to one end of said beam, said casting being generally wedge shaped and conforming to the sides and top of the angular hollow beam and having a tubular neck adjacent to the bottom thereof telescopically received within said tubular bottom chord, said casting having longitudinally outwardly projecting spaced apart tongues forming exterior surfaces co-extensive with the top and sides of the angular hollow beam.

2. A monorail section composed of an angular hollow beam having a flat top and inwardly inclined sides and having, a tubular bottom tension chord, a longitudinal top chord stiffener guide secured to said flat top, and a casting welded to one end of said beam, said casting being generally wedge shaped and conforming to the sides and top of the angular hollow beam and having a tubular neck adjacent to the bottom thereof telescopically received within said tubular bottom chord, said casting having exterior longitudinally outwardly projecting spaced apart tongues forming exterior surfaces co-extensive with the top and sides of the angular hollow beam, and at least one set of interior longitudinally outwardly projecting tongues in lateral alignment with said exterior tongues, each tongue defining an elongated slot receiving a fastener therethrough.

3. A monorail section composed of an angular hollow beam having a flat top and inwardly inclined sides and having, a tubular bottom tension chord, a longitudinal top chord stiffener guide secured to said flat top, and a casting welded to one end of said beam, said casting being generally wedge shaped and conforming to the sides and top of the angular hollow beam and having a tubular neck adjacent to the bottom thereof telescopically received within said tubular bottom chord, said casting having exterior longitudinally outwardly projecting sets of spaced apart tongues forming exterior surfaces coextensive with the top and sides of the angular hollow beam, and additional interior longitudinally outwardly projecting tongues in lateral alignment with said exterior tongues, the tongues which lie adjacent each other being similarly spaced, the said interior tongues being in two groups, one group being disposed below and adjacent the top tongues of the casting and the second group being disposed below the longitudinal centre of the casting and above the bottom tubular chord, the tongues of each of the said two interior groups having elongated slots for receiving fasteners therethrough.

4. A monorail section composed of an angular hollow beam having a flat top and inwardly inclined sides and having, a tubular bottom tension chord, a longitudinal top chord stiffener guide secured to said flat top, and a casting welded to one end of said beam, said casting being generally wedge shaped and conforming to the sides and top of the angular hollow beam and having a tubular neck adjacent to the bottom thereof telescopically received within said tubular bottom chord, said casting having exterior longitudinally outwardly projecting sets of spaced apart tongues forming exterior surfaces coextensive with the top and sides of the angular hollow beam, said casting having a wedge-shaped inwardly projecting flange and having an aperture bounded by the flange and communicating with the interior of the angular hollow beam defining an auxiliary closure.

5. A monorail section composed of an angular hollow beam having a flat top and inwardly inclined sides and having, a tubular bottom tension chord, a longitudinal top chord stiffener guide secured to said flat top, and a casting welded to one end of said beam, said casting being generally wedge shaped and conforming to the sides and top of the angular hollow beam and having a tubular neck adjacent to the bottom thereof telescopically received within said tubular bottom chord and receiving the latter, said casting having exterior longitudinally outwardly projecting sets of spaced apart tongues forming exterior surfaces co-extensive with the top and sides of the angular hollow beam, said casting having a wedge-shaped inwardly projecting flange and having an aperture bounded by the flange and communicating with the interior of the angular hollow beam defining an auxiliary closure, said flange having a peripheral inset shoulder received within the walls of the angular hollow beam for exterior smooth in-line surface connection, such flange at its base having a projected neck, and an aperture affording manual access to said neck for welding of the tubular chord upper areas.

6. The combination of two interconnected monorail sections each constructed in accordance with claim 1, the outwardly projected spaced tongues of the first section being spaced apart a distance approximately equal to the spaces between the tongues of the second section, and the tongues being interfitted and enabling controlled expansion and for contraction of the sections, and rods slidably supported within the slots of the interior interfitted tongues providing said control.

7. The combination of two interconnected monorail sections each constructed in accordance with claim 1, the outwardly projected spaced tongues of the first section being spaced apart a distance approximately equal to the spaces between the tongues of the second section, and the tongues being interfitted and enabling controlled expansion, and means slidably supported within the slots of the interior interfitted tongues for movement longitudinally of said sections for controlling expansion and contraction of the said sections, said means being in tension to apply lateral pressure on said interfitted tongues.

8. The combination of two interconnected monorail sections each constructed in accordance with claim 1, the outwardly projected spaced tongues of the first section being spaced apart a distance approximately equal to the spaces between the tongues of the second section, and the tongues being interfitted and enabling controlled expansion, and means slidably supported within the slots of the interior interfitted tongues for movement longitudinally of said sections for controlling expansion and contraction of the said sections, said means being in tension to apply lateral pressure on said interfitted tongues and having at least one rotational pressure-inducing end member exposed at a side face of an appropriate casting for adjusting said tension.

References Cited in the file of this patent

UNITED STATES PATENTS

| | | |
|---|---|---|
| 609,785 | Capewell | Aug. 30, 1898 |
| 665,718 | Armstrong | Jan. 8, 1901 |
| 2,052,865 | Burnett | Sept. 1, 1936 |
| 2,453,778 | Benbow | Nov. 16, 1948 |
| 2,539,078 | Henderson | Jan. 23, 1951 |
| 2,788,749 | Hinsken et al. | Apr. 16, 1957 |

FOREIGN PATENTS

| | | |
|---|---|---|
| 8,849 | France | Aug. 5, 1837 |